United States Patent
Rondas et al.

[15] 3,693,888
[45] Sept. 26, 1972

[54] FLUID EMITTER

[72] Inventors: Ivan V. Rondas, Mission Viejo; Mark H. Christy, Balboa, both of Calif.

[73] Assignee: Sub'Terrain Irrigation Co., Anaheim, Calif.

[22] Filed: Dec. 10, 1970

[21] Appl. No.: 96,690

Related U.S. Application Data

[63] Continuation-in-part of Ser. No. 833,634, June 16, 1969, abandoned.

[52] U.S. Cl. .................... 239/535, 138/46, 239/542, 239/547
[51] Int. Cl. .............................................. B05b 1/32
[58] Field of Search...... 239/534, 535, 542, 546, 547, 239/104, 106; 138/44, 45, 46

[56] References Cited

UNITED STATES PATENTS

| | | |
|---|---|---|
| 2,554,790 | 5/1951 | Miller .................. 239/534 UX |
| 1,804,742 | 5/1931 | Campbell .............. 239/547 X |
| 2,460,647 | 2/1949 | Miller .................. 239/534 UX |
| 2,933,102 | 4/1960 | Hillman et al........ 239/534 UX |
| 3,141,477 | 7/1964 | Campbell et al....... 239/534 X |

FOREIGN PATENTS OR APPLICATIONS

| | | | |
|---|---|---|---|
| 112,125 | 11/1965 | Netherlands .............. 239/547 |

*Primary Examiner*—Richard A. Schachen
*Assistant Examiner*—Michael Y. Mar
*Attorney*—Nienow & Frater

[57] ABSTRACT

An emitter valve having a flow regulating diaphragm which cooperates with fluid pressure to maintain valve orifices free of foreign materials. Such diaphragm is delayed in seating in response to fluid pressure to provide for preliminary purging of the valve orifices.

In one embodiment of this invention, after the time delay allowed for orifice cleansing, an annular section of the diaphragm is forced against an annular seat having an irregular opposing surface to provide a controlled seepage of fluid between the diaphragm and annular seat surrounding the outlet leading to the valve orifices. In another embodiment, the diaphragm is so supported that the fluid pressure causes it to vibrate, thus ensuring continual cleaning action.

6 Claims, 10 Drawing Figures

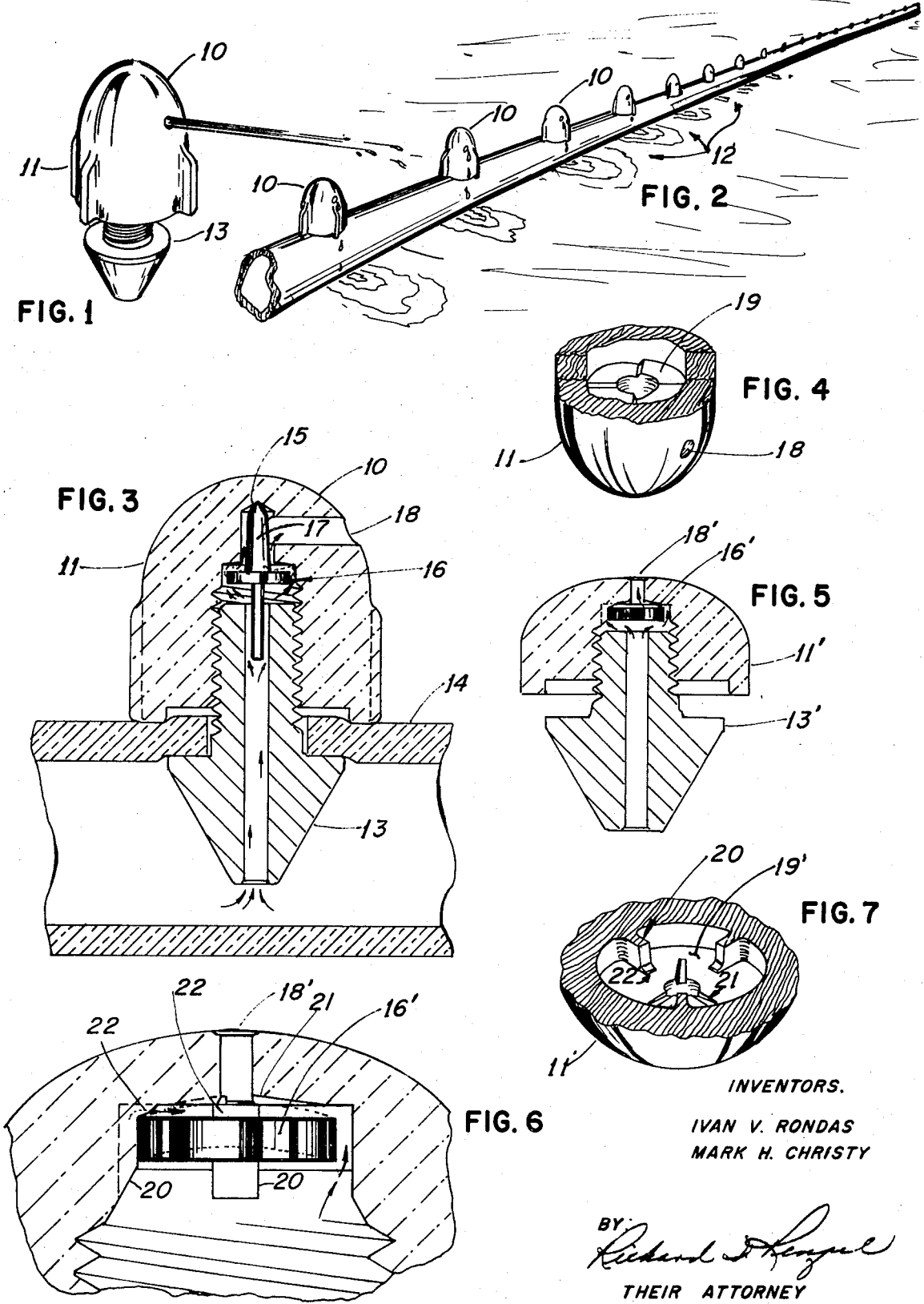

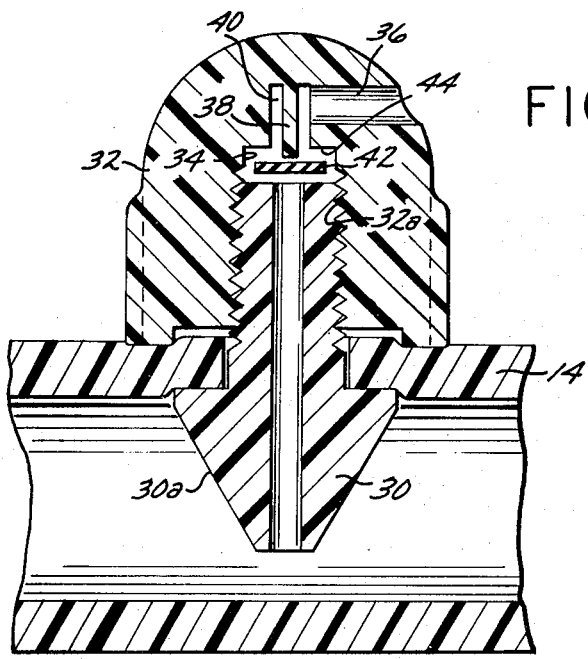
FIG. 8
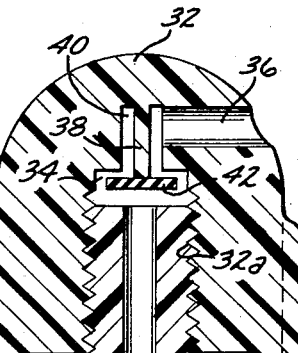
FIG. 9
FIG. 10
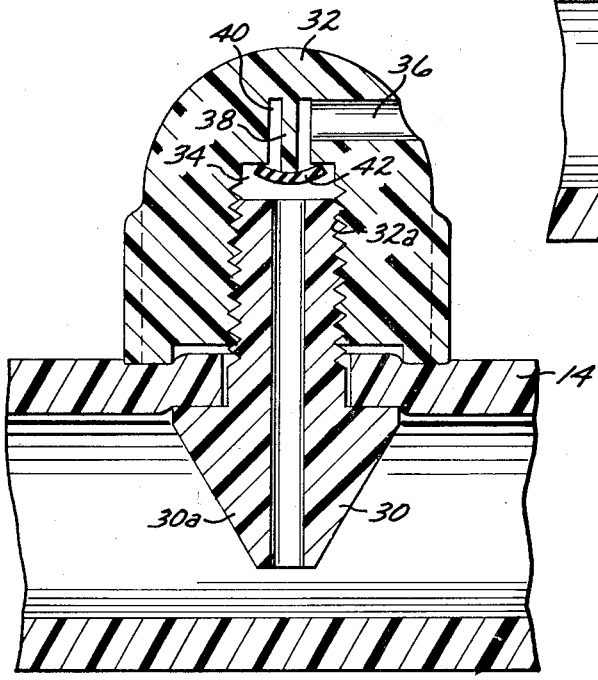
INVENTORS.
IVAN V. RONDAS
MARK H. CHRISTY
BY
Nienow & Frater
ATTORNEYS

FLUID EMITTER

This is a continuation-in-part of our application Ser. No. 833,634 filed June 16, 1969 for Emitter Valve now abandoned. Such prior application has been abandoned in favor of this continuation-in-part application.

BACKGROUND

Many techniques have been tried to properly distribute water and thereby assure an abundant crop with deep penetration of the soil and a controlled runoff. Narrow row irrigation offers less water exposed to the air and hence, less evaporation, but even with careful planning and rigid control of water flow, nearly 50 percent of the moisture fails to reach the roots and is wasted by evaporation and watering where water is not needed.

A slow emission and methodic drip offers far better penetration of the soil and with far less runoff and evaporation when compared to the flooding method. It was with this knowledge that the irrigation industry in the last few years developed several ways to produce this type or method of watering crops. For example, a perforated length of hose stretched out over a row of produce or elaborate spiraling capillary emitters and complicated valves cemented into a length of flexible hoses were provided. Many of these systems had some degree of success but there always arose problems in the form of mineral deposits which continually collected in and about the orifices causing a noticeable slowdown in the amount of water emitted and thus endangering the life of the plants nearby. If this accumulation of minerals and calcium or salts were not cleaned regularly from each and every orifice, it could and often did, close the orifices so completely that little if any water was emitted to provide the required irrigation for the support of plant life. The removal of this buildup of minerals has since proved too costly in maintenance to realize any savings from water consumption. In many instances, return to conventional methods, e.g., row flooding, was found necessary with consequent loss in conservation of water and efficiency in water consumption.

SUMMARY

One of the valves of the present invention overcomes the difficulties and problems briefly described supra by a structural arrangement having a single moving part; i.e., a resilient piston or diaphragm that is responsive to line pressure applied to the inlet to delay seating of the diaphragm until the orifice or valve outlet is purged by a jet stream capable of dislodging any residue deposits or unfiltered particles often found in the water supply and accumulating in the interior of the valve chamber, channels, or passageways. The combination of time and pressure build-up causes the resilient diaphragm to be forced against the serrated valve seat to cut off the jet stream flow and restrict the passage of water or other supplied fluids to the desired regulated flow rate at each valve in a length of water line to produce a predetermined measured amount of water during the irrigation time interval. The regulated flow rate is determined by the serrations of the valve seat; i.e., for a diaphragm of stipulated resiliency, thickness, etc. Regulation of flow rate to 60 drops per minute, for example, is readily provided by greater or lesser restriction of passage of water between the diaphragm and serrated valve seat with corresponding higher or lesser water line pressure.

Another one of the valves of the present invention overcomes such difficulties and problems by having a diaphragm formed of resilient material, and which is supported in spaced relation with its valve seat by a post or bearing member of predetermined length. The initial surge of water into this valve effectively purges the valve orifices as above explained, but the resiliency of the diaphragm and the support thereof on the post causes the water pressure to make such diaphragm vibrate substantially continually, thereby providing an action which constantly breaks up the unwanted accumulation of minerals and other chemicals within the valve itself. A space is provided between the diaphragm and the valve body through which the desired amount of fluid is permitted to flow to provide the proper flow rate of fluid from the valve.

DETAILED DESCRIPTION

Referring now to the drawings:

FIG. 1 shows an emitter valve of the present invention during purging of the orifice.

FIG. 2 illustrates a preferred application of the invention including a plurality of emitter valves inserted in a flexible tube, each valve providing a regulated flow of liquid during irrigation periods for water conservation.

FIG. 3 is a greatly enlarged cross-sectional view of an emitter valve of the present invention, inserted in the flexible tube (FIGS. 1 and 2) to show the internal construction of the valve and operation during purging.

FIG. 4 is a perspective view of the valve cap, partly broken away to show serrations of the annular valve seat formed in the cap interior, of the valve of FIG. 3.

FIGS. 5 and 6 are enlarged cross-sectional views of an alternate structural arrangement of the emitter valve of FIG. 3.

FIG. 7 is a perspective view of the valve seat of the emitter valve shown in FIGS. 5 and 6.

FIG. 8 is a sectional view of a second embodiment of the present invention.

FIG. 9 is a sectional view similar to FIG. 8, but showing the diaphragm in a first position; and FIG. 10 is a sectional view of said second embodiment showing the diaphragm in its flexed position.

Like reference characters indicate corresponding parts throughout the drawings.

The emitter valve 10 shown in FIGS. 1 to 4 and the alternate structural arrangement thereof shown in FIGS. 5 and 7, provide a precisely regulated flow of water at each valve for a typical water line 12 of an irrigation system in which the valves 10, as shown in FIG. 2, are located at any desired interval to provide irrigation only where required and to the desired penetration according to density or flow rate.

All of the valves of the invention depend upon water pressure, for example, to operate the valve piston or diaphragm from open-flow position (down) to regulated-flow position (up and deflected). Further, the valves of the invention depend upon increased pressure on the diaphragm for regulation of flow rate with water pressure. In the irrigation line 12, the valves are sequentially activated into purge and regulated flow by introducing water in the tube as indicated by the arrow.

The valve 10 of FIG. 3 comprises a valve cap 11; lower inlet member 13 tapered for insertion into a preformed hole in tube 14 of the water irrigation line 12; and piston 15 including diaphragm 16 and stem 17 passing through a central aperture (not shown) in diaphragm 16. As shown in said FIG. 3, the piston 15 including diaphragm 16 is moved upwardly by the flow of water (arrows) under pressure from the irrigation line 12. The water passes vertically through an axial passageway in member 13, past the lower section of stem 17, laterally about diaphragm (disc) 16, past the upper enlarged portion of stem 17 to the outlet orifice 18. The force of flow of water vertically which is diverted by diaphragm 16, not only causes the piston to move up until the upper end of stem 17 strikes the upper inner (end) wall of cap 11, but also causes deflection and deformation of the annular section of flexible diaphragm 16 about the upper stem portion to engage the annular seat 19 (FIG. 4). At this latter state in the operation, the valve 10 becomes flow-regulatory to 60 drops per minute, for example.

Regulation of flow, as noted earlier, depends upon flexibility and resiliency of the diaphragm 16 and the contour of the serrations in the annular seat 19 in the cap 11. Accordingly, the pressure of water in the line 12 as applied to the diaphragm 16 causes deflection and deformation of the diaphragm and annular engagement against the opposing annular surface of the seat 19. The greater the water pressure, the greater the force exerted on the diaphragm 16 to press the diaphragm against the seat 9 deforming the annular section of the diaphragm, opposing the valve seat, causing this section to follow the contour of the valve seat. The contour of serrations in seat 19 (annularly) is at an angle of 5°, for example, which allows a neopreme disc diaphragm 16 to be deformed to approximately follow the contour of the serrations thereby regulating flow to the desired drip rate, for example. Increasing line pressure at the diaphragm 16 causes closure of diaphragm and seat to the extent of restriction of flow to maintain the desired constant regulated flow rate under increasing water pressure conditions. Decreasing line pressure causes some opening between diaphragm and seat to maintain the desired constant regulated flow.

The valves 10 shown in the irrigation line 12 are inserted to be positioned as shown in FIG. 3 where preformed holes or perforations are disposed at equal intervals in tube 14 as shown in FIG. 2 or distribution at desired intervals and groupings to provide irrigation only at plant or tree locations. In operation, therefore, irrigation is regulated and distributed to such areas or locations as desired.

The first operation, an noted, is purging which is performed automatically at the start of each irrigation cycle including such interrupts in water supply thereto for additional purging during long irrigation cycles. A sequence timer, for example, is provided to sequence water lines or groups of lines and/or in addition to provide automatic interrupt for periodic jet streams and purging whenever the sequence timer interrupts the flow of water to the water line 12. The preferred operating pressure is from approximately 5 p.s.i. to 80 p.s.i., for example, with purging action performed preferably below 10 p.s.i. at respective valves 10.

With reference to the structural details of the emitter valve 10, as shown in FIG. 3, the cap 11 is internally threaded to receive the threads of inlet member 13. The lower end of the inlet is tapered (cone-shaped) to pass through the hole formed in the flexible tube 14. As shown the diameter of the hole in tube 14 is approximately the same as the threaded upper section of the inlet member 13 to seat thereon, as shown. The cap 11 is recessed above the ledge formed by lower conical section of the inlet member to clamp the valve into the tube 14, crimping the tube about the hole slightly to securely fasten the valve in position and form a watertight seal or closure at the valve location.

Referring now more particularly to the valve 10' of the alternate construction of FIGS. 5 to 7, the operation of the valve 10' in the system has the same desirable features as the valve 10 of FIGS. 1 to 4. The valve 10' is simpler in construction to the valve 10 as is clearly evident from a comparison thereof in the drawings. As shown, the cap 11 and diaphragm 16' cooperate in a slightly different manner which permits the simpler construction. The valve seat 19 (FIG. 7) retains a non-performate diaphragm 16' for longitudinal movement between radial edge guides 20. Diaphragm 16' has no holes or center opening. Steps or feet 22 limit the overall travel while providing for deflection of the diaphragm 16' which corresponds to operation of serrations of seat 19 of valve 10. In addition, radial channels 21 are provided to supplement the action of the steps 22 to regulate the rate of flow under conditions of changing water line pressure in the range of working pressure above 10 p.s.i., for example. Deflection of the diaphragm is indicated by curved-dashed lines in FIG. 6.

It is important to note the preferred construction of the diaphragm 16' and cooperating valve seat 19' in FIGS. 5 to 7 is such as to provide for return of the diaphragm 16' to the lower open position by the resiliency of the diaphragm material; e.g., neopreme rubber, and also to provide the required deformation under pressure to approximately follow the valve seat contour. After relatively long periods of operation, the diaphragm does not rely on gravity alone to return it to lower-open-position but on the memory of the resilient material which is deformed during cycles under pressure of the water supplied on the inlet side of the diaphragm. The stem 17 of valve 10 (FIG. 3) enhances this function of required deformation of the diaphragm 16 which assures return of diaphragm 16 in preparation for the next purging and irrigation cycle.

Referring to FIGS. 8, 9, and 10 of the drawings, there is shown therein, a second embodiment of the present invention. Such embodiment comprises a lower inlet member 30 similar to that shown in both of the structural configurations of the first embodiment. Such lower inlet, as shown, is inserted through an opening in the side wall of tube 14 by virtue of the tapered construction as at 30a.

Mounted on top of lower inlet member 13 is a valve cap 32 which is generally dome-shaped, similar to the cap 11 shown in the embodiment of FIGS. 1, 3, and 4. Said cap 32 is formed with a central bore 32a which is provided with internal fastening threads for cooperation with threads formed on inlet member 30. Said bore 32 terminates in a chamber 34 which communicates with an outlet 36. Interposed between chamber 34 and outlet 36 is a supporting post 38 which may be formed integrally with cap 32 or may be added thereto as desired. In either event, said post 38 projects into the chamber 34, and a generally annular connecting passageway 40 is provided between chamber 34 and outlet 36.

Positioned within chamber 34 is a diaphragm 42 in the general shape of a disc. Said diaphragm is formed of resilient material which preferably is nonabsorbing of water, such as Butrate rubber. For reasons which will be apparent to those persons skilled in the art, such diaphragm 42 should be impervious to chemicals which are found in fertilizers.

The embodiment of FIGS. 8, 9, and 10 operates generally as follows: With no water pressure within tube 14, the diaphragm 42 is permitted to seek its own position within chamber 34, as generally shown in FIG. 8. When water pressure is applied to tube 14, the water is caused to be forced upward through the inlet member 30 into the chamber 34. When this occurs, the diaphragm 42 is urged upwardly against post 38 as shown most clearly in FIG. 9 of the drawings. The initial surge of water rushes past and around such diaphragm thereby purging the passageway 40 and outlet 36. This effectively cleans the emitter from particles which may have accumulated since the last use.

Continued water pressure causes such diaphragm 42 to be bent or flexed on the post 38 as shown in FIG. 10. Said diaphragm 42 is disc-shaped, having a generally circular circumference. The post 38 is formed with a generally circular cross-section and engages the diaphragm at or near its center. This results in the water pressure causing the entire peripheral edge of the diaphragm to be urged against the valve seat 44 at one end of chamber 34.

Such deformation of diaphragm 42 causes restriction of the flow of water from chamber 34 to outlet 36 by virtue of the small space between the diaphragm and the valve seat.

However, such deformation of diaphragm 42 also causes the resistance of the diaphragm to increase so that ultimately the diaphragm attempts to return to its original flat configuration against the force of the water pressure. Soon thereafter, however, the water pressure again dominates the diaphragm causing it to again be deformed to the position shown in FIG. 10. The ultimate effect of this action is that the diaphragm 42 vibrates between its flat condition and its curved or deformed condition. The flow of water to the out 36 thus pulsates at a very high rate, causing all foreign materials to be effectively dislodged and flushed from the emitter. In this way, the entire valve structure is kept clean and free of foreign materials so as to operate for an extended period of time.

Throughout the aforedescribed operation, water is permitted to flow from the emitter shown in FIGS. 8, 9, and 10 at a desired rate. Also, fertilizers can be added to the water within tube 14 so that plant nutrients and water can be simultaneously fed to trees, shrubs, and other plants at the desired rate.

In light of the above teachings, various modifications and variations of the present invention are contemplated and will be apparent to those skilled in the art without departing from the spirit and scope of the invention.

We claim:

1. An emitter valve comprising:
   a valve body providing an enclosed valve chamber having an inlet and outlet;
   a resilient annular diaphragm disposed in said chamber between said inlet and outlet in order to be deflected axially by fluid pressure supplied at said inlet;
   an annular valve seat about said outlet for cooperating with an annular portion of said diaphragm to provide for regulated flow of fluids from said inlet to said outlet with varying fluid pressures supplied at said inlet, a valve stem coaxial with said diaphragm and secured to the diaphragm about a central opening in the diaphragm, said stem providing for limiting the axial movement of the diaphragm toward the valve seat causing the outer section of the diaphragm to be deflected to engage the opposing surface of the valve seat.

2. The emitter valve according to claim 1 in which the outlet projects axially and then radially from said valve seat to the outside of the valve body in order to provide a stop for limiting the axial movement of the diaphragm toward the valve seat.

3. An emitter valve comprising:
   a valve body providing an enclosed valve chamber having an inlet and outlet;
   a resilient annular diaphragm disposed in said chamber between said inlet and outlet in order to be deflected axially by fluid pressure supplied at said inlet;
   an annular valve seat about said outlet for cooperating with an annular portion of said diaphragm to provide for regulated flow of fluids from said inlet to said outlet with varying fluid pressures supplied at said inlet and a support post is provided in said chamber to normally support said diaphragm in spaced relation to said valve seat to enable fluid pressure from said inlet to urge said diaphragm toward said seat.

4. The emitter valve according to claim 3, wherein said post supports said diaphragm substantially at its center to enable said fluid pressure to deform said diaphragm about its periphery.

5. The emitter valve according to claim 4, wherein said post is of such size as to normally support said diaphragm approximately 0.005 inches to 0.015 inches from said valve seat.

6. The emitter valve, according to claim 5, wherein the resiliency of said diaphragm is such as to cause said diaphragm to vibrate under predetermined conditions of fluid pressure.

* * * * *